(12) United States Patent
Kitayama et al.

(10) Patent No.: US 11,845,820 B2
(45) Date of Patent: Dec. 19, 2023

(54) RESIN COMPOSITION AND DOPE FOR USE IN FILM PRODUCTION BY SOLUTION CASTING

(71) Applicant: KANEKA CORPORATION, Osaka (JP)

(72) Inventors: Fuminobu Kitayama, Osaka (JP); Takuya Kamimura, Osaka (JP)

(73) Assignee: KANEKA CORPORATION, Osaka (JP)

( * ) Notice: Subject to any disclaimer, the term of this patent is extended or adjusted under 35 U.S.C. 154(b) by 528 days.

(21) Appl. No.: 17/002,982

(22) Filed: Aug. 26, 2020

(65) Prior Publication Data
US 2020/0385500 A1 Dec. 10, 2020

Related U.S. Application Data

(63) Continuation of application No. PCT/JP2019/001714, filed on Jan. 21, 2019.

(30) Foreign Application Priority Data

Feb. 27, 2018 (JP) ................................ 2018-033493

(51) Int. Cl.
| | | |
|---|---|---|
| *C08F 220/14* | (2006.01) | |
| *G02B 1/14* | (2015.01) | |
| *C08J 5/18* | (2006.01) | |
| *C08L 33/12* | (2006.01) | |
| *C08L 51/00* | (2006.01) | |

(52) U.S. Cl.
CPC ............ *C08F 220/14* (2013.01); *C08J 5/18* (2013.01); *C08L 33/12* (2013.01); *C08L 51/00* (2013.01); *G02B 1/14* (2015.01); *C08J 2333/12* (2013.01); *C08J 2451/00* (2013.01); *C08L 2203/16* (2013.01); *C08L 2207/53* (2013.01)

(58) Field of Classification Search
CPC ......... C08F 220/18–220/20; G02B 1/00–1/18; G02B 5/00–5/32
See application file for complete search history.

(56) References Cited

U.S. PATENT DOCUMENTS

| 2014/0128547 A1* | 5/2014 | Yonemura .............. C08F 220/14 |
| | | 525/205 |
| 2019/0218322 A1* | 7/2019 | Park ...................... C08F 220/14 |

FOREIGN PATENT DOCUMENTS

| JP | 201424254 A | 2/2014 | |
| JP | 201438180 A | 2/2014 | |
| JP | 2016113579 A | 6/2016 | |
| JP | 2016147949 A | 8/2016 | |
| WO | 2011065124 A1 | 6/2011 | |
| WO | 2013005634 A1 | 1/2013 | |
| WO | WO-2018062784 A1 * | 4/2018 | ............. B29C 55/02 |

OTHER PUBLICATIONS

International Search Report issued in corresponding International Application No. PCT/JP2019/001714; dated Apr. 23, 2019 (2 pages).
Written Opinion of the International Searching Authority issued in corresponding International Application No. PCT/JP2019/001714; dated Apr. 23, 2019 (6 pages).

* cited by examiner

*Primary Examiner* — Prashant J Khatri
(74) *Attorney, Agent, or Firm* — Osha Bergman Watanabe & Burton LLP

(57) ABSTRACT

Provided is a resin composition for use in producing a resin film by solution casting, the resin composition including a methacrylic polymer that has excellent heat resistance and that allows for a high evaporation rate of a solvent when the solvent is evaporated from a cast layer in solution casting. The resin composition for use in film production by solution casting includes a methacrylic polymer (a), and the methacrylic polymer (a) is a copolymer including a methyl methacrylate unit and at least one drying-accelerating comonomer unit and has a glass transition temperature of 110° C. or higher. The drying-accelerating comonomer unit is preferably selected from the group consisting of: an N-substituted maleimide monomer unit; a methacrylic ester unit containing an ester moiety in the form of a primary, secondary, or aromatic hydrocarbon group having 2 to 8 carbon atoms; a methacrylic ester unit containing an ester moiety in the form of a saturated hydrocarbon group having a fused ring structure and having 7 to 16 carbon atoms; a methacrylic ester unit containing an ester moiety in the form of a linear or branched group containing an ether bond; and a styrenic monomer unit.

15 Claims, No Drawings

RESIN COMPOSITION AND DOPE FOR USE IN FILM PRODUCTION BY SOLUTION CASTING

TECHNICAL FIELD

The present invention relates to a methacrylic polymer-containing resin composition and a dope which are used to produce a film by solution casting.

BACKGROUND ART

Methacrylic polymers are beneficial polymers which are excellent in transparency, color quality, appearance, weathering resistance, gloss, and workability and which are therefore widely used in a variety of industrial fields. In particular, by virtue of the excellent transparency, appearance, and weathering resistance, films formed from methacrylic polymers are used in various applications such as in interior and exterior materials for automobiles, exterior materials for electronic appliances including mobile phones and smartphones, and interior and exterior materials for civil engineering and architectural products including floors, windows, interior and exterior walls, daylighting members, and road signs. Methacrylic polymers have excellent optical properties, by virtue of which they have recently been used also in optical members such as those of liquid crystal display devices and organic EL display devices.

Known methods for producing high-quality resin films include melt extrusion using a T-die and solution casting in which a dope prepared by dissolving a resin in a solvent is cast onto a surface of a support and then the solvent is evaporated to form a film. The melt extrusion using a T-die has a disadvantage in that the resulting film is likely to have a difference in physical properties between the extrusion direction and the transverse direction and have a residual orientation. In contrast, the solution casting, in which a film is formed without applying any physical pressure, has an advantage in that the film can be free of polymer orientation and is less likely to have directionality of its characteristics such as the strength and optical properties. The solution casting further offers the advantages of a very high film thickness precision, a small amount of heat applied to the resin, and a reduction in the amount of an additive such as a thermal stabilizer.

Patent Literature 1 teaches a method of producing an optical film by stretching a laminate including a layer containing an acrylic resin as a major component and a layer containing a cellulose acylate resin as a major component, the method including forming the laminate by solution casting.

CITATION LIST

Patent Literature

PTL 1: Japanese Laid-Open Patent Application Publication No. 2014-24254

SUMMARY OF INVENTION

Technical Problem

In Examples of Patent Literature 1, a polymethylmethacrylate resin is used as the acrylic resin. The polymethylmethacrylate resin is dissolved in a solvent to prepare a dope, the dope is cast onto a surface of a support to form a cast layer containing the solvent, and then the solvent is evaporated from the cast layer. This method is defective in that the evaporation of the solvent requires a lot of time and leads to a reduction in film production efficiency.

In view of the above circumstances, an object of the present invention is to provide: a resin composition for use in producing a resin film by solution casting, the resin composition including a methacrylic polymer that has excellent heat resistance and that allows for a high evaporation rate of a solvent when the solvent is evaporated from a cast layer in solution casting; and a dope including the resin composition.

Solution to Problem

The present inventors have found that the above object can be achieved by producing a methyl methacrylate-based methacrylic polymer through copolymerization of methyl methacrylate with a specific comonomer, and have completed the present invention based on this finding.

Thus, in a first aspect, the present invention relates to a resin composition for use in film production by solution casting, the resin composition including a methacrylic polymer (a), the methacrylic polymer (a) being a copolymer including a methyl methacrylate unit and at least one drying-accelerating comonomer unit, the methacrylic polymer (a) having a glass transition temperature of 110° C. or higher. The glass transition temperature is preferably 112° C. or higher.

Preferably, the drying-accelerating comonomer unit is at least one selected from the group consisting of: an N-substituted maleimide monomer unit; a methacrylic ester unit containing an ester moiety in the form of a primary, secondary, or aromatic hydrocarbon group having 2 to 8 carbon atoms; a methacrylic ester unit containing an ester moiety in the form of a saturated hydrocarbon group having a fused ring structure and having 7 to 16 carbon atoms; a methacrylic ester unit containing an ester moiety in the form of a linear or branched group containing an ether bond; and a styrenic monomer unit. The fused ring structure preferably includes two five-membered rings fused at three adjacent carbon atoms. More preferably, the drying-accelerating comonomer unit includes at least one of an N-substituted maleimide monomer unit and a methacrylic ester unit containing an ester moiety in the form of a saturated hydrocarbon group having a fused ring structure and having 7 to 16 carbon atoms. In this case, the methacrylic polymer (a) may further include: a drying-accelerating comonomer unit other than the N-substituted maleimide monomer unit and the methacrylic ester unit containing an ester moiety in the form of a saturated hydrocarbon group having a fused ring structure and having 7 to 16 carbon atoms; and/or a comonomer unit other than the other drying-accelerating comonomer unit.

Preferably, the proportion of the methyl methacrylate unit in total monomer units constituting the methacrylic polymer (a) is 70 to 99% by weight, and the proportion of the drying-accelerating comonomer unit in the total monomer units is 1 to 30% by weight. Preferably, the methacrylic polymer (a) has a weight-average molecular weight of 400,000 to 4,000,000.

The resin composition for use in film production according to the present invention may further include a graft copolymer (b) having a core layer and a shell layer.

In a second aspect, the present invention relates to a dope for use in film production by solution casting, the dope including the resin composition for use in film production according to the first aspect of the present invention and a solvent (c). Preferably, the solvent (c) includes: a solvent (c-1) for which a hydrogen bonding term δH of Hansen solubility parameters is 1 or more and 12 or less; and a solvent (c-2) for which the hydrogen bonding term δH is 14 or more and 24 or less, and the proportion by weight of the solvent (c-1) is 55% by weight or more and 95% by weight or less based on the total weight of the solvent (c).

In a third aspect, the present invention relates to a method of producing a resin film by solution casting, the method including casting the dope according to the second aspect of the present invention onto a surface of a support and subsequently evaporating the solvent.

In a fourth aspect, the present invention relates to a resin film formed from the dope according to the second aspect of the present invention. Preferably, the resin film has a thickness of 10 to 500 μm. The resin film may be a protective film provided on a surface of a substrate or may be a film for optical use. Preferably, the film for optical use is a polarizer protective film.

In a fifth aspect, the present invention relates to a polarizing plate including a polarizer and the resin film provided on the polarizer and also to a display device including the polarizing plate.

Advantageous Effects of Invention

The present invention can provide: a resin composition for use in producing a resin film by solution casting, the resin composition including a methacrylic polymer that has excellent heat resistance and that allows for a high evaporation rate of a solvent when the solvent is evaporated from a cast layer in solution casting; and a dope including the resin composition. When a resin film is produced by solution casting using this dope, high film production efficiency can be achieved thanks to the high evaporation rate of the solvent. The resulting resin film has the advantage of excellent heat resistance.

DESCRIPTION OF EMBODIMENTS

Hereinafter, embodiments of the present invention will be described. It should be noted that the present invention is not limited to the described embodiments.

Resin Composition

A resin composition of the present invention includes a methacrylic polymer (a) as a main resin and is used as a resin component of a dope used to produce a resin film by solution casting. The methacrylic polymer (a) will be described first.

Methacrylic Polymer (a)

The methacrylic polymer (a) included in the resin composition of the present invention is a copolymer including a methyl methacrylate unit and at least one drying-accelerating comonomer unit. Since the methacrylic polymer (a) is produced by copolymerizing the methyl methacrylate unit with the at least one drying-accelerating comonomer unit, the methacrylic polymer (a) allows for a higher evaporation rate of a solvent when the solvent is evaporated from a cast layer in solution casting than polymethylmethacrylate which is a homopolymer consisting solely of the methyl methacrylate unit.

The drying-accelerating comonomer unit is preferably a comonomer unit that does not significantly reduce the heat resistance of the methacrylic polymer (a). In order for the methacrylic polymer (a) having good heat resistance to be formed, the drying-accelerating comonomer unit is preferably at least one selected from the group consisting of: an N-substituted maleimide monomer unit; a methacrylic ester unit containing an ester moiety in the form of a primary, secondary, or aromatic hydrocarbon group having 2 to 8 carbon atoms; a methacrylic ester unit containing an ester moiety in the form of a saturated hydrocarbon group having a fused ring structure and having 7 to 16 carbon atoms; a methacrylic ester unit containing an ester moiety in the form of a linear or branched group containing an ether bond; and a styrenic monomer unit. With the use of such a drying-accelerating comonomer unit, the resulting methacrylic polymer can have excellent heat resistance and increase the rate of evaporation of a solvent from a cast layer in solution casting.

Examples of the N-substituted maleimide monomer include N-phenylmaleimide, N-benzylmaleimide, N-cyclohexylmaleimide, and N-methylmaleimide. Among these, maleimide monomers having a cyclic substituent on the N atom are preferred. That is, N-phenylmaleimide, N-benzylmaleimide, and N-cyclohexylmaleimide are preferred.

Examples of the methacrylic ester containing an ester moiety in the form of a primary, secondary, or aromatic hydrocarbon group having 2 to 8 carbon atoms include ethyl methacrylate, propyl methacrylate, n-butyl methacrylate, hexyl methacrylate, cyclohexyl methacrylate, 2-ethylhexyl methacrylate, octyl methacrylate, phenyl methacrylate, and benzyl methacrylate. Preferred among these are ethyl methacrylate, n-butyl methacrylate, cyclohexyl methacrylate, 2-ethylhexyl methacrylate, and benzyl methacrylate.

Examples of the methacrylic ester unit containing an ester moiety in the form of a saturated hydrocarbon group having a fused ring structure and having 7 to 16 carbon atoms include dicyclopentanyl methacrylate and isobornyl methacrylate. The number of carbon atoms in the saturated hydrocarbon group is preferably 8 to 14 and more preferably 9 to 12. The fused ring structure is preferably, but not limited to, a fused ring structure including two five-membered rings fused at three adjacent carbon atoms.

Examples of the methacrylic ester unit containing an ester moiety in the form of a linear or branched group containing an ether bond include 2-methoxyethyl methacrylate.

Examples of the styrenic monomer include styrene, α-methylstyrene, monochlorostyrene, and dichlorostyrene. Among these, styrene is preferred.

In order to achieve a high rate of evaporation of a solvent from a cast layer in solution casting and enhance the heat resistance of the methacrylic polymer, the drying-accelerating comonomer unit preferably includes at least one of the N-substituted maleimide monomer unit and the methacrylic ester unit containing an ester moiety in the form of a saturated hydrocarbon group having a fused ring structure and having 7 to 16 carbon atoms.

In this case, only at least one of the N-substituted maleimide monomer unit and the methacrylic ester unit containing an ester moiety in the form of a saturated hydrocarbon group having a fused ring structure and having 7 to 16 carbon atoms may be used as the drying-accelerating comonomer unit, or another drying-accelerating comonomer unit may be used in combination with at least one of the N-substituted maleimide monomer unit and the methacrylic ester unit containing an ester moiety in the form of a saturated hydrocarbon group having a fused ring structure and having 7 to 16 carbon atoms. With this combined use, the heat resistance of the methacrylic polymer and the evaporation rate of the solvent can be conditioned so that both of the two properties are increased in a balanced manner.

The drying-accelerating comonomer unit other than the N-substituted maleimide monomer unit and the methacrylic ester unit containing an ester moiety in the form of a saturated hydrocarbon group having a fused ring structure and having 7 to 16 carbon atoms may be at least one selected from the group consisting of the above-described methacrylic ester unit containing an ester moiety in the form of a primary, secondary, or aromatic hydrocarbon group having 2 to 8 carbon atoms, the above-described methacrylic ester unit containing an ester moiety in the form of a linear or branched group containing an ether bond, and the above-described styrenic monomer unit.

The proportion of the methyl methacrylate unit in the total monomer units constituting the methacrylic polymer (a) is preferably 70 to 99% by weight, more preferably 75 to 98% by weight, and even more preferably 80 to 97% by weight. The proportion of the drying-accelerating comonomer unit in the total monomer units constituting the methacrylic polymer (a) is preferably 1 to 30% by weight, more preferably 2 to 25% by weight, and even more preferably 3 to 20% by weight. In the case where the methacrylic polymer (a) contains two or more drying-accelerating comonomer units, the phrase "the proportion of the drying-accelerating comonomer unit" refers to the total proportion of all the contained drying-accelerating comonomer units in the total monomer units. When containing the methyl methacrylate unit and the drying-accelerating comonomer unit in the above proportions by weight, the methacrylic polymer (a) can have excellent heat resistance and increase the evaporation rate of the solvent in solution casting. The proportions by weight of these units can be determined by proton nuclear magnetic resonance spectroscopy.

The methacrylic polymer (a) may be a copolymer free of any other comonomer unit that is not classifiable as the drying-accelerating comonomer unit or may be a copolymer containing another comonomer unit that is not classifiable as the drying-accelerating comonomer unit. Examples of the other comonomer include: methacrylic esters such as stearyl methacrylate, glycidyl methacrylate, epoxycyclohexylmethyl methacrylate, dimethylaminoethyl methacrylate, 2-hydroxyethyl methacrylate, 2-hydroxypropyl methacrylate, 2,2,2-trifluoroethyl methacrylate, 2,2,2-trichloroethyl methacrylate, methacrylamide, and N-methylolmethacrylamide; acrylic esters such as methyl acrylate, ethyl acrylate, propyl acrylate, butyl acrylate, 2-ethylhexyl acrylate, octyl acrylate, glycidyl acrylate, epoxycyclohexylmethyl acrylate, 2-hydroxyethyl acrylate, 2-hydroxypropyl acrylate, acrylamide, and N-methylolacrylamide; carboxylic acids such as methacrylic acid and acrylic acid; salts of such carboxylic acids; vinyl cyanides such as acrylonitrile and methacrylonitrile; maleic acid, fumaric acid, and esters thereof; vinyl halides such as vinyl chloride, vinyl bromide, and chloroprene; vinyl esters such as vinyl formate, vinyl acetate, and vinyl propionate; and alkenes such as ethylene, propylene, butylene, butadiene, and isobutylene. The proportion of the other comonomer unit in the total monomer units constituting the methacrylic polymer (a) is preferably 10% by weight or less, more preferably 8% by weight or less, and even more preferably 5% by weight or less.

In view of workability and appearance, the methacrylic polymer (a) is preferably free of a unit derived from a polyfunctional monomer such as allyl methacrylate, diallyl phthalate, triallyl cyanurate, monoethylene glycol dimethacrylate, tetraethylene glycol dimethacrylate, tetraethylene glycol dimethacrylate, or divinylbenzene.

The weight-average molecular weight of the methacrylic polymer (a) is preferably, but not limited to, 400,000 to 4,000,000. When the weight-average molecular weight is in this range, the dope has a viscosity suitable for solution casting and, in addition, the resulting film is so tough that the film can easily be handled when used in various applications. The weight-average molecular weight is more preferably 800,000 to 3,500,000 and even more preferably 1,000,000 to 3,000,000. The weight-average molecular weight can be calculated by a standard polystyrene equivalent method using gel permeation chromatography (GPC).

The methacrylic polymer (a) has excellent heat resistance. In the present invention, the glass transition temperature is used as an indicator of the heat resistance. The methacrylic polymer (a) has a glass transition temperature of 110° C. or higher. The glass transition temperature of the methacrylic polymer (a) can be controlled within this range by adjusting, for example, the type of the drying-accelerating comonomer unit used (when two or more drying-accelerating comonomer units are used, the types and combinations of the two or more drying-accelerating comonomer units) and the proportion(s) of the drying-accelerating comonomer unit(s) in the whole resin. The glass transition temperature is preferably 112° C. or higher, more preferably 114° C. or higher, even more preferably 117° C. or higher, still even more preferably 119° C. or higher, particularly preferably 122° C. or higher, and most preferably 125° C. or higher.

To produce the methacrylic polymer (a), any of known polymerization methods such as suspension polymerization, emulsion polymerization, bulk polymerization, and solution polymerization can be used.

Graft Copolymer (b)

The resin composition of the present invention may further include a graft copolymer (b) having a core layer and a shell layer. The graft copolymer has excellent thermal stability, provides excellent transparency and color quality to the resin film formed from the resin composition of the present invention, and contributes to improving the mechanical strength properties such as flex resistance and crack resistance of the resin film.

The graft copolymer (b) as defined in the present invention is one which may be called a multistage polymer, a multi-layered polymer, or a core-shell polymer. Such a polymer has a polymer layer (shell layer) formed by polymerization of a monomer mixture in the presence of crosslinked polymer particles (core layer). Each of the core and shell layers may consist of one layer or two or more layers. The graft copolymer (b) is not limited to a particular one, and a known graft copolymer can be used as appropriate. An example of the graft copolymer is one obtained as follows: a monomer mixture containing an acrylic ester as a major component and a crosslinker are subjected to polymerization to form a rubbery acrylic ester polymer, and then a monomer mixture containing a methacrylic ester as a major component is polymerized in the presence of the rubbery acrylic ester polymer. The graft copolymer can be produced by a common emulsion polymerization method using a known emulsifier.

When the resin composition of the present invention includes the graft copolymer (b), the proportions in which the methacrylic polymer (a) and the graft copolymer (b) are mixed differ depending on, for example, the intended use of the film. For example, it is preferable that the amount of the methacrylic polymer (a) be 30 to 98 parts by weight and the amount of the graft copolymer (b) be 70 to 2 parts by weight based on 100 parts by weight of the total amount of the two polymers (a) and (b). It is more preferable that the amount of the methacrylic polymer (a) be 50 to 95 parts by weight and the amount of the graft copolymer (b) be 50 to 5 parts by weight, and it is particularly preferable that the amount of the methacrylic polymer (a) be 60 to 90 parts by weight and the amount of the graft copolymer (b) be 40 to 10 parts by weight. When the amount of the methacrylic polymer (a) is 30 parts by weight or more, the methacrylic polymer (a) can fully exhibit its characteristics. When the amount of the methacrylic polymer (a) is 98 parts by weight or less, the inclusion of the graft copolymer (b) provides a satisfactory improvement in the mechanical strength properties of the methacrylic polymer.

Other Components

The resin composition of the present invention may, if appropriate, include: a known additive such as a light stabilizer, an ultraviolet absorber, a thermal stabilizer, a matting agent, a light diffuser, a colorant, a dye, a pigment, an antistatic, a heat-ray reflector, a lubricant, a plasticizer, an ultraviolet absorber, a stabilizer, or a filler; or another resin such as a styrene resin (e.g., acrylonitrile styrene resin or styrene maleic anhydride resin), a polycarbonate resin, a polyvinyl acetal resin, a cellulose acylate resin, a fluorine resin (e.g., polyvinylidene fluoride or polyfluoroalkyl (meth)acrylate resin), a silicone resin, a polyolefin resin, a polyethylene terephthalate resin, or a polybutylene terephthalate resin.

In order to adjust the orientation birefringence of the film to be formed, the resin composition of the present invention may, if appropriate, include birefringent inorganic fine particles as disclosed in Japanese Patent No. 3648201 or Japanese Patent No. 4336586 or a birefringent low-molecular compound as disclosed in Japanese Patent No. 3696649 which has a molecular weight of 5000 or less, preferably 1000 or less.

The resin composition of the present invention is not limited to a particular form. The resin composition may be in the form of powder or pellets.

Dope

The dope of the present invention includes at least the resin composition of the present invention and a solvent (c) and is used to produce a resin film by solution casting. In the dope of the present invention, the methacrylic polymer (a) and the other components are dissolved or dispersed in the solvent (c). The other components including the graft copolymer may be those contained in the resin composition of the present invention or may be those added to the solvent separately from the resin composition of the present invention when the dope is prepared.

Solvent

The solvent (c) included in the dope of the present invention is not particularly limited as long as the solvent is one in which the methacrylic polymer (a) and the other components are soluble or dispersible. The solvent (c) preferably includes a solvent (c-1) for which a hydrogen bonding term $\delta H$ of Hansen solubility parameters is 1 or more and 12 or less. When the dope is formed using such a solvent, high solubility or dispersibility of the methacrylic polymer (a) in the solvent can be achieved. A solvent for which the hydrogen bonding term $\delta H$ is 3 or more and 10 or less is preferred, and a solvent for which the hydrogen bonding term $\delta H$ is 5 or more and 8 or less is more preferred.

Solubility parameters (SP values) have been conventionally known as indicators of the solubilities of materials, and Hansen solubility parameters have been proposed as such SP values. The Hansen solubility parameters consist of cohesive energy terms classified according to the type of interaction energy between molecules (London dispersion force, dipole-dipole interaction force, and hydrogen bonding force), and the cohesive energy terms are expressed as a London dispersion force term, a dipole-dipole interaction force term, and a hydrogen bonding force term, respectively. In the present invention, the hydrogen bonding term $\delta H$ of the Hansen solubility parameters is used as an indicator of the solubilities of the methacrylic polymer (a) and the graft copolymer (b) in the solvent. A study by the present inventors has revealed that the value of the hydrogen bonding term $\delta H$ is more correlated with the solubility of the methacrylic polymer (a) in the solvent than the values of the London dispersion force term and dipole-dipole interaction force term and that the hydrogen bonding term $\delta H$ can serve as an indicator of the solubility. The details of the hydrogen bonding term $\delta H$ are described, for example, in "Feature Article: Design for Polymer Compatibilization 1. Solubility Evaluation by Hansen Solubility Parameters (HSP values)", Hideki YAMAMOTO, Adhesion Technology, Japan, Vol. 34, No. 3, 2014 (116th issue), pp. 1-8.

Examples of the solvent (c-1) for which the hydrogen bonding term $\delta H$ is 1 or more and 12 or less include 1,4-dioxane (9.0), 2-phenylethanol (11.2), acetone (7.0), acetonitrile (6.1), chloroform (5.7), dibasic acid ester (8.4), diacetone alcohol (10.8), N,N-dimethylformamide (11.3), dimethyl sulfoxide (10.2), ethyl acetate (7.2), γ-butyrolactone (7.4), methyl ethyl ketone (5.1), methyl isobutyl ketone (4.1), methylene chloride (7.1), n-butyl acetate (6.3), N-methyl-2-pyrrolidone (7.2), propylene carbonate (4.1), 1,1,2,2-tetrachloroethane (5.3), tetrahydrofuran (8.0), and toluene (2.0). The parenthesized numerals designate the values of the hydrogen bonding term $\delta H$. One of these solvents may be used alone, or two or more thereof may be used as a mixture.

Among the above solvents, methyl ethyl ketone, chloroform, and methylene chloride are preferred because they have a high ability to dissolve the methacrylic polymer (a) and a high evaporation rate. More preferred is methylene chloride.

The solvent included in the dope of the present invention may consist of the solvent (c-1) for which the hydrogen bonding term $\delta H$ is 1 or more and 12 or less. However, in view of improving film formability, film peelability, and ease of handling in solution casting, the solvent preferably includes the solvent (c-1) for which the hydrogen bonding term $\delta H$ is 1 or more and 12 or less and a solvent (c-2) for which the hydrogen bonding term $\delta H$ is 14 or more and 24 or less.

Examples of the solvent (c-2) for which the hydrogen bonding term $\delta H$ is 14 or more and 24 or less include methanol (22.3), ethanol (19.4), isopropanol (16.4), butanol (15.8), and ethylene glycol monoethyl ether (14.3). One of these solvents may be used alone, or two or more thereof may be used as a mixture.

When the solvent (c-1) for which the hydrogen bonding term $\delta H$ is 1 or more and 12 or less is used together with the solvent (c-2) for which the hydrogen bonding term $\delta H$ is 14 or more and 24 or less, the amount of the solvent (c-1) is preferably 55% by weight or more and 95% by weight or less, more preferably 60% by weight or more and 90% by weight or less, even more preferably 65% by weight or more and 85% by weight or less, and still even more preferably 70% by weight or more and 85% by weight or less, based on the total weight of the solvent (c) included in the dope.

The proportion of the resin components (the total of the methacrylic polymer (a) and the graft copolymer (b)) in the dope of the present invention is not particularly limited and may be chosen as appropriate in view of the solubilities or dispersibilities of the methacrylic polymer (a) and graft copolymer (b) in the solvent used in the dope and in view of the conditions under which solution casting is carried out. The proportion of the resin components in the dope is preferably 5 to 50% by weight, more preferably 10 to 45% by weight, and even more preferably 15 to 40% by weight. The dope of the present invention may include the graft copolymer (b) and other components which are described above.

Solution Casting

The dope of the present invention is used to produce a resin film by solution casting. Specifically, a resin film can be produced by casting the dope of the present invention onto a surface of a support and subsequently evaporating the solvent.

The following describes an example of how to carry out solution casting in the present invention. It should be noted that the present invention is not limited to the solution casting as described below. First, pellets containing the methacrylic polymer (a), the graft copolymer (b), and optionally the above-mentioned other component(s) are prepared, and then the pellets are mixed with the solvent (c) to prepare a dope containing the polymer (a), the copolymer (b), and optionally the other component(s) which are dissolved or dispersed in the solvent (c). Alternatively, the methacrylic polymer (a), the graft copolymer (b), and optionally the other component(s) may be mixed simultaneously or sequentially with the solvent (c) to prepare a dope containing the polymer (a), the copolymer (b), and optionally the other component(s) which are dissolved or dispersed in the solvent (c). Alternatively, the methacrylic polymer (a) and the graft copolymer (b) may be individually mixed with the solvent (c) to prepare two or more preliminary dope solutions, and the preliminary solutions may be mixed to prepare a dope. The above dissolution step can be carried out at a temperature and pressure adjusted as appropriate. Depending on the situation, the method may be preferred in which pellets containing the methacrylic polymer (a), the graft copolymer (b), and optionally the other component(s) are prepared and then the pellets are dissolved or dispersed in the solvent (c). After the dissolution step as described above, the resulting dope may be filtered or degassed.

Next, the dope is fed to a pressure die by a feed pump and cast through a slit of the pressure die onto a surface (a mirrored surface) of a support such as an endless belt or a drum made of metal or synthetic resin, thus forming a dope layer.

The dope layer formed is heated on the support to evaporate the solvent, thus forming a film. The conditions under which the solvent is evaporated may be chosen as appropriate depending on the boiling point of the solvent used.

The film thus obtained is peeled from the surface of the support. Where appropriate, the peeled film may subsequently be subjected to other steps such as a drying step, a heating step, and a stretching step.

Resin Film

The resin film of the present invention is formed by solution casting using the dope described above. The thickness of the film is preferably, but not limited to, 500 μm or less. The thickness is more preferably 300 μm or less and particularly preferably 200 μm or less. The thickness is preferably 10 μm or more, more preferably 30 μm or more, even more preferably 50 μm or more, and particularly preferably 60 μm or more. Controlling the thickness of the film within the above range offers an advantage in that when vacuum forming is performed using the film, the film resists deformation and resists breakage at a deep drawing portion. Additionally, when the thickness is within the above range, the film produced can have uniform distribution of optical properties and have high transparency. If the film thickness exceeds the above range, cooling of the formed film proceeds unevenly, so that the distribution of the optical properties tends to be non-uniform. If the film thickness falls below the above range, the handling of the film may be difficult.

The total light transmittance of the resin film of the present invention, as measured at a film thickness of 80 μm, is preferably 85% or more, more preferably 88% or more, and even more preferably 90% or more. When the total light transmittance is within the above range, the resin film has high transparency and can thus be suitably used in applications requiring light permeability, such as in optical members, decorative applications, interior applications, and vacuum forming applications.

The glass transition temperature of the resin film of the present invention is preferably 90° C. or higher, more preferably 100° C. or higher, even more preferably 110° C. or higher, still even more preferably 115° C. or higher, particularly preferably 120° C. or higher, and most preferably 124° C. or higher. When the glass transition temperature is within the above range, the resin film obtained can exhibit excellent heat resistance.

The haze of the resin film of the present invention, as measured at a film thickness of 80 μm, is preferably 2.0% or less, more preferably 1.5% or less, even more preferably 1.3% or less, and particularly preferably 1.0% or less. The internal haze of the film is preferably 1.5% or less, more preferably 1.0% or less, even more preferably 0.5% or less, and particularly preferably 0.3% or less. When the haze and the internal haze are within the above ranges, the resin film has high transparency and is thus suitable for use in applications requiring light permeability, such as in optical members, decorative applications, interior applications, and vacuum forming applications. The haze includes a haze at the inside of the film and a haze at the surface (outside) of the film, and the two types of hazes are referred to as "internal haze" and "external haze", respectively.

The resin film of the present invention can be used as an optical film. The optical anisotropy of the resin film is preferably small, especially when the resin film is used as a polarizer protective film. In particular, it is preferable that not only the optical anisotropy in the in-plane directions (length direction and width direction) of the film but also the optical anisotropy in the thickness direction of the film be small. That is, it is preferable that the absolute values of both the in-plane phase difference and the through-thickness phase difference be small. More specifically, the absolute value of the in-plane phase difference is preferably 10 nm or less, more preferably 6 nm or less, even more preferably 5 nm or less, and particularly preferably 3 nm or less. The absolute value of the through-thickness phase difference is preferably 50 nm or less, more preferably 20 nm or less, even more preferably 15 nm or less, still even more preferably 10 nm or less, and most preferably 5 nm or less. The film having such phase differences can be suitably used as a polarizer protective film included in a polarizing plate of a liquid crystal display device. If the absolute value of the in-plane phase difference of the film is more than 10 nm or the absolute value of the through-thickness phase difference of the film is more than 50 nm, the film may, when used as a polarizer protective film included in a polarizing plate of a liquid crystal display device, cause a problem such as a reduction in contrast of the liquid crystal display device.

The phase differences are indicators calculated based on birefringence. The in-plane phase difference (Re) and the through-thickness phase difference (Rth) can be calculated by the equations shown below, respectively. For an ideal film which is completely optically isotropic in the three-dimensional directions, both the in-plane phase difference Re and the through-thickness phase difference Rth are zero.

$$Re=(nx-ny)\times d$$

$$Rth=((nx+ny)/2-nz)\times d$$

In the above equations, nx denotes a refractive index along an X-axis extending in an in-plane direction in which the film is elongated (the direction of the polymer chain orientation), ny denotes a refractive index along a Y-axis transverse to the X-axis, and nz denotes a refractive index along a Z-axis extending in the thickness direction of the film. In the equations, d denotes the thickness of the film, and nx−ny denotes the orientation birefringence. The MD direction of the film is defined as the direction of the X-axis, and when the film is a stretched film, the stretching direction is defined as the direction of the X-axis.

For the resin film of the present invention, the value of the orientation birefringence is preferably $-2.6\times10^{-4}$ to $2.6\times10^{-4}$, more preferably $-2.1\times10^{-4}$ to $2.1\times10^{-4}$, even more preferably $-1.7\times10^{-4}$ to $1.7\times10'$, still even more preferably $-1.6\times10^{-4}$ to $1.6\times10'$, still even more preferably $-1.5\times10^{-4}$ to $1.5\times10^{-4}$, still even more preferably $-1.0\times10^{-4}$ to $1.0\times10'$, particularly preferably $-0.5\times10^{-4}$ to $0.5\times10'$, and most preferably $-0.2\times10^{-4}$ to $0.2\times10'$. When the orientation birefringence is within the above range, this means that the occurrence of birefringence is prevented during the forming process, and stable optical properties can be achieved. The resin film of the present invention is very suitable as an optical film for use in, for example, liquid crystal displays.

Stretching

The resin film of the present invention may be produced as a stretched film although the resin film exhibits high toughness and flexibility even when provided as an unstretched film. The stretching can provide improvements in the mechanical strength properties and thickness precision of the film.

When the resin film of the present invention is produced as a stretched film, the resin composition of the present invention is first formed into an unstretched film and then the film is uniaxially or biaxially stretched. Alternatively, in the film forming process, stretching operation may be performed as appropriate during the progress of the steps of film formation and solvent evaporation. In either way, a stretched film (uniaxially-stretched film or biaxially-stretched film) can be produced. The stretching during the film forming process and the stretching after the film forming process may be combined as appropriate.

The stretching ratio for the stretched film is not particularly limited, and may be chosen depending on the various characteristics such as the mechanical strength properties, the surface properties, and the thickness precision of the stretched film to be produced. In general, the stretching ratio is preferably selected from the range of 1.1 to 5 times, more preferably selected from the range of 1.3 to 4 times, and even more preferably selected from the range of 1.5 to 3 times, although the preferred range depends on the stretching temperature. When the stretching ratio is within the above range, the mechanical characteristics such as the elongation degree, the tear propagation strength, and the crumple resistance of the film can be considerably improved.

Applications

Where necessary, the gloss of the surface of the resin film of the present invention can be reduced by a known method. An example of the method is to add an inorganic filler or crosslinkable polymer particles. The film as obtained may be subjected to embossing to form a surface-textured layer having a prismatic texture, a pattern, a design, or a knurled texture or to reduce the gloss of the surface of the film.

Where necessary, another film may be provided on the resin film of the present invention by dry lamination and/or thermal lamination using a pressure-sensitive adhesive or an adhesive, and the resulting laminate may be used. Where necessary, a functional layer such as a hard coat layer, an antireflection layer, an antifouling layer, an antistatic layer, a printed decorative layer, a metallic luster layer, a surface-textured layer, or a matte layer may be formed on the front or back surface of the resin film of the present invention, and the resulting laminate may be used.

The resin film of the present invention can be used in various applications exploiting its characteristics such as high heat resistance, transparency, and flexibility. For example, the resin film can be used in interior and external materials for automobiles, interior and external materials for personal computers, interior and external materials for mobile phones, interior and external materials for solar cells, and back sheets for solar cells. The resin film can be used also in the following products: products in the field of imaging, such as image-capturing lenses, finders, filters, prisms, Fresnel lenses, and lens covers for cameras, VTRs, and projectors; products in the field of lenses, such as optical disc pick-up lenses of CD players, DVD players, and MD players; products in the field of optical recording, such as optical discs such as CDs, DVDs, and MDs; products in the field of information devices, such as films for organic EL displays, films for liquid crystal displays (e.g., light guide plates, diffuser plates, back sheets, reflective sheets, polarizer protective films, polarizing film transparent resin sheets, phase difference films, light-diffusing films, and prism sheets for liquid crystal displays), and surface protective films; products in the field of optical communication, such as optical fibers, optical switches, and optical connectors; products in the automotive field, such as headlights, tail lamp lenses, inner lenses, instrument covers, and sunroofs of automobiles; products in the field of medical equipment, such as eyeglasses, contact lenses, lenses for endoscopes, and medical products requiring sterilization; products in the field of architecture and architectural materials, such as road signs, bathroom furnishings, floorings, light-transmitting plates for roads, lenses for double-glazed glass, daylighting windows, carports, lenses for lighting devices, lighting covers, and siding for buildings; and various other products such as containers (dishes) for microwave oven cooking, housings of household electrical appliances, toys, sunglasses, and stationery products. Additionally, the resin film of the present invention can be used as an alternative to a transfer foil used for formation of a molded article.

The resin film of the present invention can be used by being provided on a substrate made of metal or plastic. Examples of the method of providing the resin film on a substrate include: laminate molding; wet lamination in which an adhesive is applied to a metal plate such as a steel plate, then the film is placed on the metal plate, and the adhesive is dried to bond the film and plate together; and other lamination methods such as dry lamination, extrusion lamination, and hot-melt lamination.

Examples of the method of providing the film on a plastic member include: insert molding or laminate injection press molding in which the film is placed in a mold and then the mold is filled with a resin by injection molding; and in-mold molding in which the film preformed is placed in a mold and then the mold is filled with a resin by injection molding.

The resulting laminate including the resin film of the present invention can be used, for example, in the following products: automotive interior and exterior materials as alternatives to paints; civil engineering and architectural products such as window frames, bathroom furnishings, wall paper, floorings, daylighting or dimming members, soundproof walls, and road signs; domestic articles such as everyday sundries, furniture, and housings of electrical appliances; housings of office automation equipment such as facsimile machines, laptop computers, and copying machines; various optical members, optical elements, and electric or electronic parts, such as front panels of liquid crystal display screens of terminals including mobile phones, smartphones and tablet computers, lenses for lighting devices, automotive headlights, optical lenses, optical fibers, optical discs, and light guide plates for liquid crystal displays; medical products requiring sterilization; and various other products such as toys, recreational goods, and fiber-reinforced resin composites.

In particular, since the resin film of the present invention is excellent in heat resistance and optical properties, the resin film is suitable as a film for optical use and can be used in various optical members. The resin film can be used in known optical applications, such as in: front panels of liquid crystal display screens of terminals including mobile phones, smartphones, and tablet computers; lenses for lighting devices; automotive headlights; optical lenses; optical fibers; optical discs; liquid crystal display device-related products such as light guide plates, diffuser plates, back sheets, reflective sheets, polarizing film transparent resin sheets, phase difference films, light-diffusing films, prism sheets, surface protective films, optically isotropic films, polarizer protective films, and transparent conductive films; organic EL device-related products; and products in the field of optical communication.

EXAMPLES

Hereinafter, the present invention will be specifically described using examples. It should be noted that the present invention is not limited to the examples described below. In the following description, the term "part" and "%" respectively mean "part by weight" and "% by weight", unless otherwise specified. The testing methods for various properties described in the examples and comparative examples are as follows.

Testing Methods

1. Weight-Average Molecular Weight

The weight-average molecular weight (Mw) of each methacrylic polymer was calculated by a standard polystyrene equivalent method using gel permeation chromatography (GPC). The GPC column used was a column packed with a crosslinked polystyrene gel (product name: Shodex GPC K-806M, manufactured by Showa Denko K.K.), and the GPC solvent used was chloroform. The sample solution was prepared by dissolving 5 mg of the methacrylic polymer in 2 ml of chloroform. The column temperature was set to 40° C.

2. Glass Transition Temperature

The glass transition temperature (Tg) of each methacrylic polymer was measured using a differential scanning calorimeter (DSC, product name: Q1000, manufactured by TA Instruments, Inc.). The sample was placed in a stream of nitrogen, heated to 200° C. at a rate of 10° C./min, then rapidly cooled to 40° C., and heated again to 200° C. at a rate of 10° C./min. For the glass transition observed during the second heating, the average of the extrapolated onset temperature and the extrapolated endset temperature was determined, and this average was used as the glass transition temperature.

3. Proportions of Monomer-Derived Repeating Units

The proportions of repeating units contained in each methacrylic polymer and derived from monomers used for production of the polymer were determined by proton nuclear magnetic resonance ($^1$H-NMR) spectroscopy. The methacrylic polymer was added to a solvent for NMR to prepare a sample solution, the spectrum of which was measured using a nuclear magnetic resonance spectrophotometer (product name: AVANCE III 400, manufactured by Bruker Corporation). Based on the obtained spectrum, integrals of peaks attributed to the repeating units derived from the monomers were determined, and the proportions of the contained repeating units were calculated from the ratios of the integrals to one another.

4. Drying Rate

For each methacrylic polymer, the drying rate was evaluated based on the residual volatile matter content of a methacrylic polymer film sample prepared by drying at 90° C. for 40 minutes.

The film sample was prepared by the following procedures. First, a solvent mixture was prepared from 164 g of dichloromethane and 36 g of methanol, and 2 g of the methacrylic polymer was added and dissolved in 18 g of the solvent mixture to prepare a dope with a solids concentration of 10%. This dope was applied onto a polyethylene terephthalate film (PET film, product name: COSMOSHINE A4100, manufactured by Toyobo Co., Ltd.) to a wet thickness of 0.5 mm, and immediately dried in a hot air dryer at 40° C. for 10 minutes to form a semi-dry film. This semi-dry film was peeled from the PET film and cut into a rectangular piece having a length of 15 to 20 cm and a width of 3 to 4 cm, and this rectangular piece was further dried in another hot air dryer at 90° C. for 40 minutes. Thus, the film sample was obtained.

The residual volatile matter content of the film sample was determined by the following procedures using a thermal weight reduction method. First, the film sample was dried in a hot air dryer at 180° C. for 1 hour. Next, the weight W1 of the film sample before the drying at 180° C. and the weight W2 of the film sample after the drying at 180° C. were substituted into the following equation (1) to calculate the residual volatile matter content.

$$\text{Residual volatile matter content}(\%) = \{(W1-W2)/W1\} \times 100 \qquad (1)$$

Finally, a percentage change R in residual volatile matter content from that determined for polymethylmethacrylate (PMMA) was calculated using the following equation (2). In this equation, R0 denotes the residual volatile matter content determined for PMMA and R1 denotes the residual volatile matter content determined for the evaluation sample.

$$R(\%) = \{(R1-R0)/R0\} \times 100 \qquad (2)$$

The abbreviations used hereinafter represent the materials listed below, respectively.

MMA: Methyl methacrylate
PhMI: N-Phenylmaleimide
CHMI: N-Hexylmaleimide
BzMI: N-Benzylmaleimide
EMA: Ethyl methacrylate
n-BMA: n-Butyl methacrylate 2-EHMA: 2-Ethylhexyl methacrylate
CHMA: Cyclohexyl methacrylate
BzMA: Benzyl methacrylate
2-MEMA: 2-Methoxyethyl methacrylate
St: Styrene
DCPMA: Dicyclopentanyl methacrylate
IBOMA: Isobornyl methacrylate
SMA: Stearyl methacrylate
t-BMA: t-Butyl methacrylate
TMSMA: Trimethylsilyl methacrylate
3-FMA: 2-Trifluoroethyl methacrylate
THFMA: Tetrahydrofurfuryl methacrylate
NIPMAA: N-Isopropylmethacrylamide Example 1: Production of Methacrylic Polymer a An 8-liter glass reactor equipped with an H-shaped stirrer was charged with 200 parts of deionized water and 0.5 parts of disodium phosphate serving as a suspension aid. A monomer mixture solution was then added into the reactor while the contents of the reactor were stirred at 300 rpm. The monomer mixture solution was composed of: 95 parts of MMA in which 0.3 parts of lauroyl peroxide was dissolved; 5 parts of PhMI; and 0.046 parts of 2-ethylhexyl thioglycolate (2-EHTG) serving as a chain transfer agent. The contents of the reactor were heated to 60° C. under nitrogen purge, and thus polymerization was initiated. At the moment when 50 minutes elapsed after the temperature of 60° C. was reached, 0.15 parts of Adeka Pluronic F-68 (polyoxyethylene-polyoxypropylene block copolymer, manufactured by ADEKA Corporation), which is a nonionic water-soluble polymer, was added as a suspension stabilizer. The reaction was then allowed to proceed at 60° C. for 200 minutes, after which the contents of the reactor were heated to 80° C. and stirred for 3 hours to complete the polymerization. The resulting polymer was washed four times with an amount of deionized water three times greater than the resin amount, and the washed polymer was dried to obtain suspension polymer particles in the form of beads. These particles are referred to as a methacrylic polymer a.

For the methacrylic polymer a thus obtained, the proportions by weight of the monomer-derived repeating units were determined to be MMA/PhMI=95.4/4.6. The Mw was 2,560,000 and the Tg was 125.6° C.

The methacrylic polymer a was evaluated for the drying rate, and as a result the residual volatile matter content was determined to be 3.9%. This value is 2.9% lower than that for polymethylmethacrylate (PMMA) which is a homopolymer of MMA, and indicates that the methacrylic polymer a exhibited a higher drying rate than PMMA. This result has demonstrated that the use of the methacrylic polymer a can reduce the time required for the film drying step in solution casting, thus leading to improvement in the efficiency of film production by solution casting.

Examples 2 to 13: Production of Methacrylic Polymers b to m

Methacrylic polymers b to m were produced in the same manner as the methacrylic polymer a was produced, except that the types and amounts of the monomers and the amount of the chain transfer agent were varied as shown in Table 1.

TABLE 1

| Methacrylic polymer | MMA | PhMI | CHMI | BzMI | EMA | n-BMA | 2-EHMA | CHMA | BzMA | 2-MEMA | St | DCPMA | IBOMA | Chain transfer agent [parts] |
|---|---|---|---|---|---|---|---|---|---|---|---|---|---|---|
| a | 95 | 5 | | | | | | | | | | | | 0.046 |
| b | 90 | 10 | | | | | | | | | | | | 0.046 |
| c | 95 | | 5 | | | | | | | | | | | 0.029 |
| d | 75 | | 25 | | | | | | | | | | | 0.6 |
| e | 95 | | | 5 | | | | | | | | | | 0.027 |
| f | 95 | | | | 5 | | | | | | | | | 0.027 |
| g | 95 | | | | | 5 | | | | | | | | 0.027 |
| h | 90 | | | | | 10 | | | | | | | | 0.027 |
| i | 95 | | | | | | 5 | | | | | | | 0.027 |
| j | 95 | | | | | | | 5 | | | | | | 0.027 |
| k | 95 | | | | | | | | 5 | | | | | 0.027 |
| l | 95 | | | | | | | | | 5 | 5 | | | 0.027 |
| m | 95 | | | | | | | | | | | 5 | | 0.027 |
| n | 90 | | | | | | | | | | | 10 | | 0.01 |
| o | 95 | | | | | | | | | | | | 5 | 0.01 |
| p | 85 | | | | | | | | | | | | 15 | 0.01 |

TABLE 2

| | Methacrylic polymer | | | | | | | | | | | | | |
|---|---|---|---|---|---|---|---|---|---|---|---|---|---|---|
| | | Proportions by weight of monomer-derived repeating units [%] | | | | | | | | | | | | |
| | | MMA | PhMI | CHMI | BzMI | EMA | n-BMA | 2-EHMA | CHMA | BzMA | 2-MEMA | St | DCPMA | IBOMA |
| Example 1 | a | 95.4 | 4.6 | | | | | | | | | | | |
| Example 2 | b | 90.6 | 9.4 | | | | | | | | | | | |
| Example 3 | c | 95.2 | | 4.8 | | | | | | | | | | |
| Example 4 | d | 76.8 | | 23.2 | | | | | | | | | | |
| Example 5 | e | 95.4 | | | 4.6 | | | | | | | | | |

TABLE 2-continued

| | | | C1 | C2 | C3 | C4 | C5 | C6 | C7 |
|---|---|---|---|---|---|---|---|---|---|
| Example 6 | f | 95.0 | 5.0 | | | | | | |
| Example 7 | g | 94.4 | | 5.6 | | | | | |
| Example 8 | h | 89.0 | | 11.0 | | | | | |
| Example 9 | i | 94.3 | | | 5.7 | | | | |
| Example 10 | j | 95.2 | | | | 4.8 | | | |
| Example 11 | k | 95.3 | | | | | 4.7 | | |
| Example 12 | l | 96.0 | | | | | | 4.0 | |
| Example 13 | m | 94.8 | | | | | | | 5.2 |
| Example 14 | n | 90.0 | | | | | | | | 10 | |
| Example 15 | o | 95.0 | | | | | | | | | 5 |
| Example 16 | p | 85.0 | | | | | | | | | 15 |

| | | | Cast film | | |
|---|---|---|---|---|---|
| | Methacrylic polymer | | Volatile matter | Percentage change in volatile matter content from that determined | Film |
| | Mw [×10000] | Tg [° C.] | content [%] (*1) | for PMMA [%] (*2) | thickness [μm] |
| Example 1 | 256.0 | 125.6 | 3.9 | −2.9 | 38 |
| Example 2 | 225.4 | 127.5 | 3.4 | −13.6 | 38 |
| Example 3 | 268.8 | 125.9 | 3.3 | −16.5 | 39 |
| Example 4 | 50.1 | 123.1 | 3.8 | −6.0 | 42 |
| Example 5 | 312.9 | 122.3 | 3.5 | −13.5 | 39 |
| Example 6 | 133.9 | 119.2 | 3.6 | −9.1 | 42 |
| Example 7 | 134.1 | 113.2 | 3.5 | −12.0 | 42 |
| Example 8 | 136.4 | 110.2 | 3.0 | −25.7 | 43 |
| Example 9 | 125.8 | 112.7 | 3.1 | −23.2 | 39 |
| Example 10 | 127.9 | 117.9 | 3.6 | −8.8 | 39 |
| Example 11 | 142.4 | 117.6 | 3.8 | −3.8 | 37 |
| Example 12 | 132.6 | 114.5 | 3.5 | −3.2 | 40 |
| Example 13 | 153.8 | 120.3 | 3.2 | −19.8 | 39 |
| Example 14 | 183.2 | 117.0 | 3.9 | −1.4 | 41 |
| Example 15 | 189.6 | 126.7 | 3.6 | −10.9 | 39 |
| Example 16 | 190.4 | 127.3 | 3.5 | −12.6 | 40 |

*1: The volatile matter content was determined by a thermal weight reduction method using a film dried by heating at 90° C. for 40 minutes.
*2: The percentage change was calculated based on the volatile matter content determined for methacrylic polymer aa (PMMA). The volatile matter content determined for methacrylic polymer aa is shown in Table 6.

Example 14: Production of Methacrylic Polymer n

An 8-liter glass reactor equipped with an H-shaped stirrer was charged with a given amount of deionized water and 0.1 parts of disodium phosphate serving as a suspension aid. A monomer mixture solution was then added into the reactor while the contents of the reactor were stirred at 300 rpm. The monomer mixture solution was composed of: 90 parts of MMA in which 0.3 parts of lauroyl peroxide was dissolved; 10 parts of DCPMA; and 0.01 parts of 2-EHTG Further, 0.4 parts of Adeka Pluronic F-68 was added as a suspension stabilizer. The contents of the reactor were heated to a given temperature under nitrogen purge, and thus the polymerization was initiated. After the given temperature was reached, the reaction was allowed to proceed for 120 minutes, and then the contents were further heated from the given temperature and stirred for 3 hours to complete the polymerization. The resulting polymer was washed four times with an amount of deionized water three times greater than the resin amount, and the washed polymer was dried to obtain suspension polymer particles in the form of beads. These particles are referred to as a methacrylic polymer n.

Examples 15 and 16: Production of Methacrylic Polymers o and p

Methacrylic polymers o and p were produced in the same manner as the methacrylic polymer n was produced, except that the types and amounts of the monomers were varied as shown in Table 1.

The evaluation results of the various physical properties of the methacrylic polymers a to p were as shown in Table 2. All of the methacrylic polymers of the examples exhibited a higher drying rate than PMMA, which proved that the use of any of the methacrylic polymers of the examples can improve the efficiency of film production by solution casting. As for the glass transition temperature (Tg), all of the methacrylic polymers of the examples exhibited a glass transition temperature of 110° C. or higher and were demonstrated to have high heat resistance. Among the methacrylic polymers of the examples, the methacrylic polymers of Examples 1 to 5, each of which was produced using an N-substituted maleimide as a monomer, exhibited particularly high heat resistance, and the methacrylic polymers of Examples 15 and 16, each of which was produced using as a monomer a methacrylic ester containing a saturated hydrocarbon group having a fused ring structure and having 7 to 16 carbon atoms, also exhibited particularly high heat resistance. Some monomers such as n-BMA and 2-EHMA, which were used for production of the methacrylic polymers g to i of Examples 7 to 9, were found to have the property of having a marked effect on increase in the drying rate but causing the methacrylic polymers to have lower heat resistance than the methacrylic polymers produced from other monomers.

These findings lead to the conclusion that when a methacrylic polymer is produced using both a monomer such as n-BMA or 2-EHMA which has the above-mentioned property and an N-substituted maleimide or a methacrylic ester containing a saturated hydrocarbon group having a fused ring structure and having 7 to 16 carbon atoms, the methacrylic polymer produced can exhibit both excellent drying rate and high heat resistance.

Examples 17 to 22: Production of Methacrylic Polymers q to v

Methacrylic polymers q to v were produced in the same manner as the methacrylic polymer a was produced, except that the types and amounts of the monomers and the amount of the chain transfer agent were varied as shown in Table 3.

Example 23: Production of Methacrylic Polymer w

A methacrylic polymer w was produced in the same manner as the methacrylic polymer n was produced, except that the types and amounts of the monomers were varied as shown in Table 3.

The evaluation results of the various physical properties of the methacrylic polymers q to w were as shown in Table 4. For the methacrylic polymer u, the proportions by weight of the monomer-derived repeating units were not able to be calculated because the peaks attributed to CHMI and 2-EHMA overlapped each other in the $^1$H-NMR analysis. For the other methacrylic polymers, there was no significant difference between the proportions of the parts by weight of CHMI and 2-EHMA used as starting materials and the proportions by weight of the monomer-derived repeating units in the polymers. In view of this fact, the proportions by weight of the monomer-derived repeating units in the methacrylic polymer u are assumed to be MMA/CHMI/2-EHMA=90/5/5.

TABLE 3

| Methacrylic polymer | MMA | PhMI | CHMI | EMA | n-BMA | 2-EHMA | SMA | IBOMA | Chain transfer agent [parts] |
|---|---|---|---|---|---|---|---|---|---|
| q | 90 | 5 |  | 5 |  |  |  |  | 0.046 |
| r | 90 | 5 |  |  | 5 |  |  |  | 0.027 |
| s | 90 | 5 |  |  |  | 5 |  |  | 0.027 |
| t | 90 |  | 5 | 5 |  |  |  |  | 0.027 |
| u | 90 |  | 5 |  |  | 5 |  |  | 0.027 |
| v | 90 | 5 |  |  |  |  | 5 |  | 0.027 |
| w | 90 |  |  |  | 5 |  |  | 5 | 0.006 |

TABLE 4

| | | Methacrylic polymer | | | | | | | | Mw [×10000] | Tg [° C.] | Volatile matter content [%] (*1) | Cast film Percentage change in volatile matter content from that determined for PMMA [%] (*2) | Film thickness [μm] |
|---|---|---|---|---|---|---|---|---|---|---|---|---|---|---|
| | | Proportions by weight of monomer-derived repeating units [%] | | | | | | | | | | | | |
| | | MMA | PhMI | CHMI | EMA | n-BMA | 2-EHMA | SMA | IBOMA | | | | | |
| Example 17 | q | 90.5 | 4.6 |  | 4.9 |  |  |  |  | 255.9 | 124.8 | 3.7 | −7.7 | 40 |
| Example 18 | r | 90.6 | 4.8 |  |  | 4.6 |  |  |  | 268.6 | 120.0 | 2.7 | −32.1 | 38 |
| Example 19 | s | 89.8 | 4.6 |  |  |  | 5.6 |  |  | 270.3 | 119.9 | 2.2 | −44.5 | 38 |
| Example 20 | t | 89.8 |  | 5.5 | 4.7 |  |  |  |  | 280.5 | 121.3 | 3.7 | −8.5 | 41 |
| Example 21 | u | 90 (*3) |  | 5 (*3) |  |  | 5 (*3) |  |  | 272.8 | 118.6 | 2.6 | −33.7 | 40 |
| Example 22 | v | 88.7 | 5.8 |  |  |  |  | 5.5 |  | 248.8 | 115.3 | 3.1 | −21.5 | 34 |
| Example 23 | w | 90.4 |  |  |  | 5.1 |  |  | 4.5 | 119.6 | 121.8 | 3.8 | −5.3 | 41 |

*1: The volatile matter content was determined by a thermal weight reduction method using a film dried by heating at 90° C. for 40 minutes.

*2: The percentage change was calculated based on the volatile matter content determined for methacrylic polymer aa (PMMA). The volatile matter content determined for methacrylic polymer aa is shown in Table 6.

*3: The proportions by weight of the monomer-derived repeating units were not able to be calculated because the peaks attributed to CHMI and 2-EHMA overlapped each other in the $^1$H-NMR analysis. The listed values are the monomer proportions by weight which are shown also in Table 1.

All of the methacrylic polymers q to w of Examples 17 to 23 exhibited a higher drying rate than PMMA, which proved that the use of any of the methacrylic polymers of these examples can improve the efficiency of film production by solution casting. Comparison of Examples 7 and 8 with Examples 18, 20, and 23, and comparison of Example 9 with Examples 19 and 21 reveal that, as expected above, a drop in heat resistance caused by the use of n-BMA or 2-EHMA was reduced by the use of an N-substituted maleimide monomer or IBOMA to achieve both excellent drying rate and high heat resistance.

Comparative Example 1: Production of Methacrylic Polymer aa

An 8-liter glass reactor equipped with an H-shaped stirrer was charged with 200 parts of deionized water and 0.5 parts of disodium phosphate serving as a suspension aid. A monomer mixture solution was then added into the reactor while the contents of the reactor were stirred at 300 rpm. The monomer mixture solution was composed of: 100 parts of MMA in which 0.3 parts of lauroyl peroxide was dissolved; and 0.027 parts of 2-EHTG The contents of the reactor were heated to 60° C. under nitrogen purge, and thus polymerization was initiated. At the moment when 50 minutes elapsed after the temperature of 60° C. was reached, 0.15 parts of Adeka Pluronic F-68 (polyoxyethylene-polyoxypropylene block copolymer, manufactured by ADEKA Corporation), which is a nonionic water-soluble polymer, was added as a suspension stabilizer. The reaction was then allowed to proceed at 60° C. for 200 minutes, after which the contents of the reactor were heated to 80° C. and stirred for 3 hours to complete the polymerization. The resulting polymer was washed four times with an amount of deionized water three times greater than the resin amount, and the washed polymer was dried to obtain suspension polymer particles in the form of beads. These particles are referred to as a methacrylic polymer aa.

For the methacrylic polymer aa thus obtained, the Mw was 1,264,000 and the Tg was 117.3° C. As a result of evaluation of the drying rate, the residual volatile matter content was determined to be 4.0%. In the present invention, the residual volatile matter content of 4.0% determined for the methacrylic polymer aa is used as a reference for evaluation of the drying rate since the methacrylic polymer aa is PMMA produced using only MMA as the monomer.

Comparative Examples 2 to 8: Production of Methacrylic Polymers ab to ah

Methacrylic polymers ab to ah were produced in the same manner as the methacrylic polymer aa was produced, except that the types and amounts of the monomers and the amount of the chain transfer agent were varied as shown in Table 5.

TABLE 5

| Methacrylic polymer | Monomer [parts] | | | | | | | Chain transfer agent [parts] |
|---|---|---|---|---|---|---|---|---|
| | MMA | SMA | t-BMA | TMSMA | 3-FMA | THFMA | NIPMAA | |
| aa | 100 | | | | | | | 0.027 |
| ab | 95 | 5 | | | | | | 0.027 |
| ac | 95 | | 5 | | | | | 0.027 |
| ad | 85 | | 15 | | | | | 0.027 |
| ae | 95 | | | 5 | | | | 0.027 |
| af | 95 | | | | 5 | | | 0.027 |
| ag | 95 | | | | | 5 | | 0.027 |
| ah | 95 | | | | | | 5 | 0.027 |

TABLE 6

| | Methacrylic polymer | | | | | | | | | | Cast film | | |
|---|---|---|---|---|---|---|---|---|---|---|---|---|---|
| | | Proportions by weight of monomer-derived repeating units [%] | | | | | | | Mw | Tg | Volatile matter content | Percentage change in volatile matter content from that determined for PMMA [%] (*2) | Film thickness |
| | | MMA | SMA | t-BMA | TMSMA | 3-FMA | THFMA | NIPMAA | [×10000] | [° C.] | [%] (*1) | | [μm] |
| Comparative Example 1 | aa | 100.0 | | | | | | | 126.4 | 117.3 | 4.0 | 0.0 | 42 |
| Comparative Example 2 | ab | 94.4 | 5.6 | | | | | | 136.5 | 108.9 | 2.6 | −35.8 | 39 |
| Comparative Example 3 | ac | 94.9 | | 5.1 | | | | | 118.9 | 112.9 | 4.3 | +8.1 | 40 |
| Comparative Example 4 | ad | 86.6 | | 13.4 | | | | | 128.6 | 117.5 | 4.2 | +4.0 | 39 |
| Comparative Example 5 | ae | 96.7 | | | 3.3 | | | | 156.8 | 119.3 | 4.2 | +5.9 | 36 |
| Comparative Example 6 | af | 95.0 | | | | 5.0 | | | 130.6 | 118.1 | 4.0 | +1.1 | 39 |

TABLE 6-continued

| | | Methacrylic polymer | | | | | | | | | Cast film | | |
| --- | --- | --- | --- | --- | --- | --- | --- | --- | --- | --- | --- | --- | --- |
| | | Proportions by weight of monomer-derived repeating units [%] | | | | | | | Mw | Tg | Volatile matter content | Percentage change in volatile matter content from that determined for | Film thickness |
| | | MMA | SMA | t-BMA | TMSMA | 3-FMA | THFMA | NIPMAA | [×10000] | [° C.] | [%] (*1) | PMMA [%] (*2) | [μm] |
| Comparative Example 7 | ag | 94.8 | | | | 5.2 | | | 154.0 | 114.5 | 4.5 | +13.9 | 36 |
| Comparative Example 8 | ah | 95.6 | | | | | | 4.4 | 189.5 | 116.0 | 4.1 | +2.3 | 39 |

*1: The volatile matter content was determined by a thermal weight reduction method using a film dried by heating at 90° C. for 40 minutes.
*2: The percentage change was calculated based on the volatile matter content determined for methacrylic polymer aa (PMMA).

The evaluation results of the various physical properties of the polymers ab to ah were as shown in Table 6. The methacrylic polymer ab of Comparative Example 2 exhibited a high drying rate; however, the methacrylic polymer ab had a glass transition temperature as low as 108.9° C. and was found to have insufficient heat resistance. The methacrylic polymers ac to ah of Comparative Examples 3 to 8 exhibited a lower drying rate than PMMA and were found to be unable to offer the effect of the present invention.

The invention claimed is:

1. A resin composition for use in film production by solution casting,
the resin composition comprising a methacrylic polymer (a), the methacrylic polymer (a) being a copolymer comprising a methyl methacrylate unit and at least one drying-accelerating comonomer unit, the methacrylic polymer (a) having a glass transition temperature of 110° C. or higher,
wherein the drying-accelerating comonomer unit comprises an N-substituted maleimide monomer unit,
wherein the methacrylic polymer (a) further comprises: a drying-accelerating comonomer unit other than the N-substituted maleimide monomer unit; and/or a comonomer unit other than the drying-accelerating comonomer unit,
wherein the drying-accelerating comonomer unit other than the N-substituted maleimide monomer unit is at least one selected from the group consisting of 2-ethylhexyl methacrylate, and benzyl methacrylate,
wherein the comonomer unit other than the drying-accelerating comonomer unit is stearyl methacrylate, and
wherein the proportion of the methyl methacrylate unit in total monomer units constituting the methacrylic polymer (a) is 70 to 99% by weight, the proportion of the drying-accelerating comonomer unit in the total monomer units is 1 to 30% by weight, and the proportion of the comonomer unit other than the drying-accelerating comonomer unit in the total monomer units is 0 to 10% by weight.

2. The resin composition for use in film production according to claim 1, wherein the glass transition temperature is 112° C. or higher.

3. The resin composition for use in film production according to claim 1, wherein the methacrylic polymer (a) has a weight-average molecular weight of 400,000 to 4,000,000.

4. The resin composition for use in film production according to claim 1, further comprising a graft copolymer (b) having a core layer and a shell layer.

5. The resin composition for use in film production according to claim 1, wherein the resin composition has a percentage change, R, in residual volatile matter content defined as:
the residual volatile matter content: Residual volatile matter content (%)={(W1−W2)W1}×100
where W1 is the weight of a film sample before drying at 180° C. for 1 hour, W2 is the weight of the film sample after drying at 180° C. for 1 hour,
relative to the residual volatile matter content of polymethylmethacrylate, where $R(\%)=\{(R1-R0)/R0\}\times 100$, where R1 is the residual volatile matter content determined for the film sample, and R0 is the residual volatile matter content of polymethylmethacrylate,
wherein the percentage change R in residual volatile matter content is at least −44.5% and at most −7.7%.

6. A dope for use in film production by solution casting, the dope comprising
a resin composition for use in film production, the resin composition comprising a methacrylic polymer (a), the methacrylic polymer (a) being a copolymer comprising a methyl methacrylate unit and at least one drying-accelerating comonomer unit, the methacrylic polymer (a) having a glass transition temperature of 110° C. or higher, and
a solvent (c),
wherein the drying-accelerating comonomer unit comprises an N-substituted maleimide monomer unit,
wherein the methacrylic polymer (a) further comprises: a drying-accelerating comonomer unit other than the N-substituted maleimide monomer unit; and/or a comonomer unit other than the drying-accelerating comonomer unit,
wherein the drying-accelerating comonomer unit other than the N-substituted maleimide monomer unit is at least one selected from the group consisting of 2-ethylhexyl methacrylate, and benzyl methacrylate,
wherein the comonomer unit other than the drying-accelerating comonomer unit is stearyl methacrylate, and
wherein the proportion of the methyl methacrylate unit in total monomer units constituting the methacrylic polymer (a) is 70 to 99% by weight, the proportion of the drying-accelerating comonomer unit in the total monomer units is 1 to 30% by weight, and the proportion of the comonomer unit other than the drying-accelerating comonomer unit in the total monomer units is 0 to 10% by weight.

7. The dope according to claim 6, wherein the solvent (c) comprises: a solvent (c-1) for which a hydrogen bonding term δH of Hansen solubility parameters is 1 or more and 12 or less; and a solvent (c-2) for which the hydrogen bonding term δH is 14 or more and 24 or less, and the proportion by weight of the solvent (c-1) is 55% by weight or more and 95% by weight or less based on the total weight of the solvent (c).

8. A method of producing a resin film by solution casting, the method comprising casting the dope according to claim 6 onto a surface of a support and subsequently evaporating the solvent.

9. A resin film formed from the dope according to claim 6.

10. The resin film according to claim 9, wherein the resin film has a thickness of 10 to 500 μm.

11. The resin film according to claim 9, wherein the resin film is a protective film provided on a surface of a substrate.

12. The resin film according to claim 9, wherein the resin film is a film for optical use.

13. The resin film according to claim 12, wherein the film for optical use is a polarizer protective film.

14. A polarizing plate comprising a polarizer and the resin film according to claim 13, the resin film being provided on the polarizer.

15. A display device comprising the polarizing plate according to claim 14.

\* \* \* \* \*